(12) United States Patent
Smith et al.

(10) Patent No.: US 12,718,424 B1
(45) **Date of Patent: *Aug. 25, 2026**

(54) SPLIT APPLICATIONS IN A MULTI-USER COMMUNICATION SESSION

(71) Applicant: Apple Inc., Cupertino, CA (US)

(72) Inventors: Connor A. Smith, San Mateo, CA (US); Nicholas W. Henderson, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 18/507,191

(22) Filed: Nov. 13, 2023

Related U.S. Application Data

(63) Continuation of application No. 17/482,013, filed on Sep. 22, 2021, now Pat. No. 11,816,759.

(60) Provisional application No. 63/082,740, filed on Sep. 24, 2020.

(51) Int. Cl.

| | |
|---|---|
| ***G06T 11/00*** | (2026.01) |
| ***G06F 3/01*** | (2006.01) |
| ***G06T 7/70*** | (2017.01) |

(52) U.S. Cl.
CPC .............. *G06T 11/00* (2013.01); *G06F 3/011* (2013.01); *G06T 7/70* (2017.01)

(58) Field of Classification Search
CPC ............. G06T 11/00; G06T 7/70; G06F 3/011
See application file for complete search history.

(56) References Cited

U.S. PATENT DOCUMENTS

| | | | | |
|---|---|---|---|---|
| 2011/0141043 | A1* | 6/2011 | Soubrie | G06F 3/04883 345/173 |
| 2014/0368537 | A1* | 12/2014 | Salter | G06F 3/011 345/633 |
| 2017/0109936 | A1* | 4/2017 | Powderly | G06F 3/04883 |
| 2019/0126149 | A1* | 5/2019 | Hariton | G06T 19/006 |
| 2019/0180506 | A1* | 6/2019 | Gebbie | G06T 19/00 |
| 2020/0074749 | A1* | 3/2020 | Greasley | G06T 19/20 |
| 2020/0139248 | A1* | 5/2020 | Sefcik | A63F 13/60 |
| 2020/0218074 | A1* | 7/2020 | Hoover | G02B 27/0189 |
| 2020/0356233 | A1* | 11/2020 | Boesel | G06F 3/0346 |
| 2021/0097875 | A1* | 4/2021 | Alexander, IV | G09B 5/12 |

* cited by examiner

*Primary Examiner* — Yu Chen
(74) *Attorney, Agent, or Firm* — Blank Rome LLP

(57) ABSTRACT

Split applications and virtual objects in a multi-user communication session may include presenting, for a first device, a first environmental representation of the multi-user communication session, wherein the first device and the second device are active in the multi-user communication session, and wherein the first environmental representation and a second environmental representation of the multi-user communication session for the second device comprise one or more shared virtual objects presented in a common spatial configuration; duplicating a particular shared virtual object that is located at an initial location in the common spatial configuration; determining a modified location for the duplicated virtual object in the first environmental representation; and presenting a modified first environmental representation comprising the duplicated virtual object at the modified location.

20 Claims, 9 Drawing Sheets

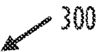
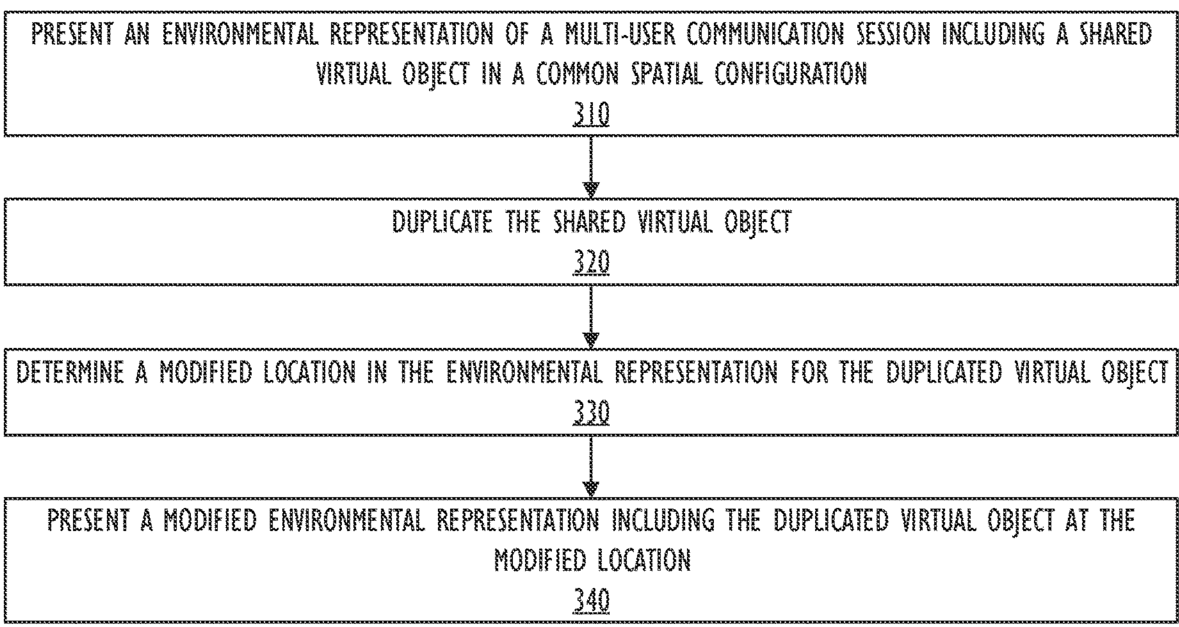
FIG. 3

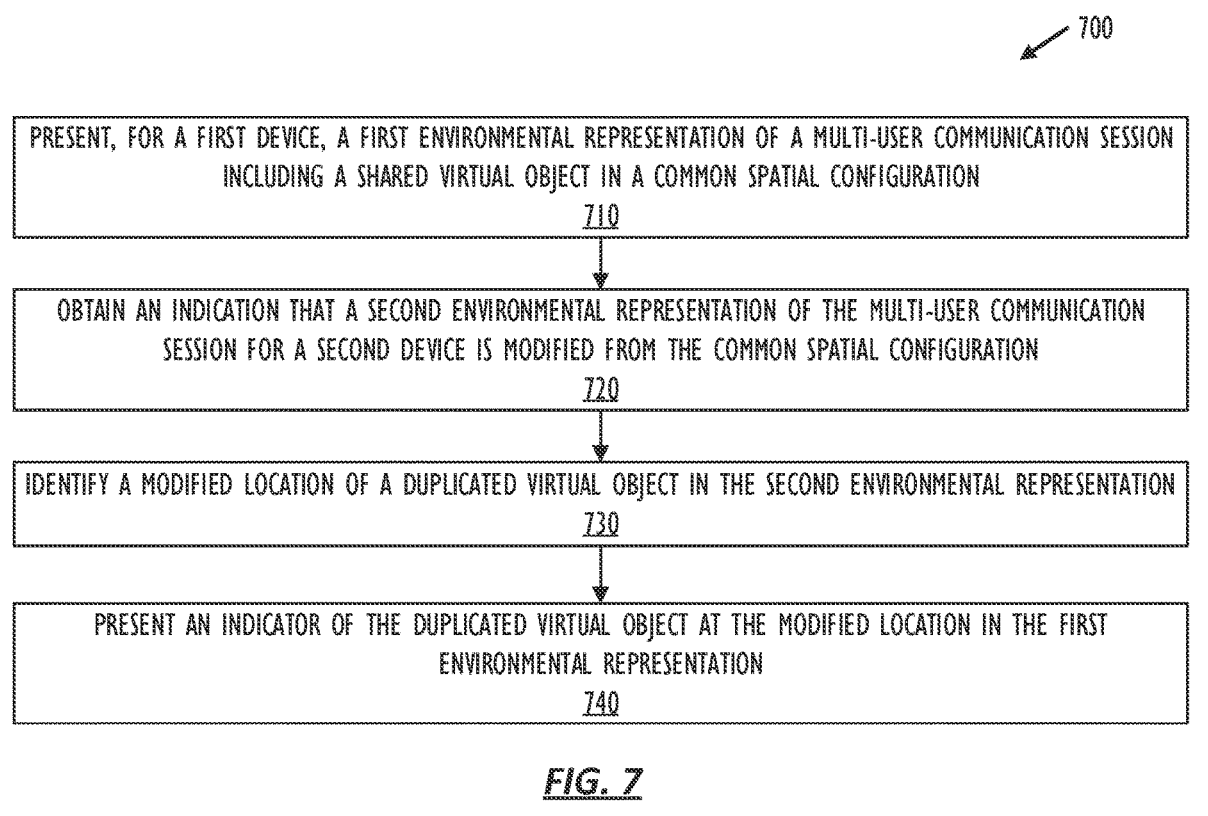

700

PRESENT, FOR A FIRST DEVICE, A FIRST ENVIRONMENTAL REPRESENTATION OF A MULTI-USER COMMUNICATION SESSION INCLUDING A SHARED VIRTUAL OBJECT IN A COMMON SPATIAL CONFIGURATION
710

OBTAIN AN INDICATION THAT A SECOND ENVIRONMENTAL REPRESENTATION OF THE MULTI-USER COMMUNICATION SESSION FOR A SECOND DEVICE IS MODIFIED FROM THE COMMON SPATIAL CONFIGURATION
720

IDENTIFY A MODIFIED LOCATION OF A DUPLICATED VIRTUAL OBJECT IN THE SECOND ENVIRONMENTAL REPRESENTATION
730

PRESENT AN INDICATOR OF THE DUPLICATED VIRTUAL OBJECT AT THE MODIFIED LOCATION IN THE FIRST ENVIRONMENTAL REPRESENTATION
740

FIG. 7

SPLIT APPLICATIONS IN A MULTI-USER COMMUNICATION SESSION

BACKGROUND

This disclosure relates generally to multi-user environments. More particularly, but not by way of limitation, this disclosure relates to techniques and systems for duplicating shared virtual objects in a multi-user extended reality environment.

Some devices are capable of generating and presenting extended reality (XR) environments. An XR environment may include a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. Some XR environments allow multiple users to interact with each other within the XR environment. However, what is needed is an improved technique to duplicate shared virtual objects in an XR environment.

BRIEF DESCRIPTION OF THE DRAWINGS

FIG. 3 shows, in flow chart form, an example method for improving duplication of shared virtual objects in an XR environment, according to one or more embodiments.

FIG. 7 shows, in flow chart form, a further example method for improving duplication of shared virtual objects in an XR environment, according to one or more embodiments.

DETAILED DESCRIPTION

Figure 1:
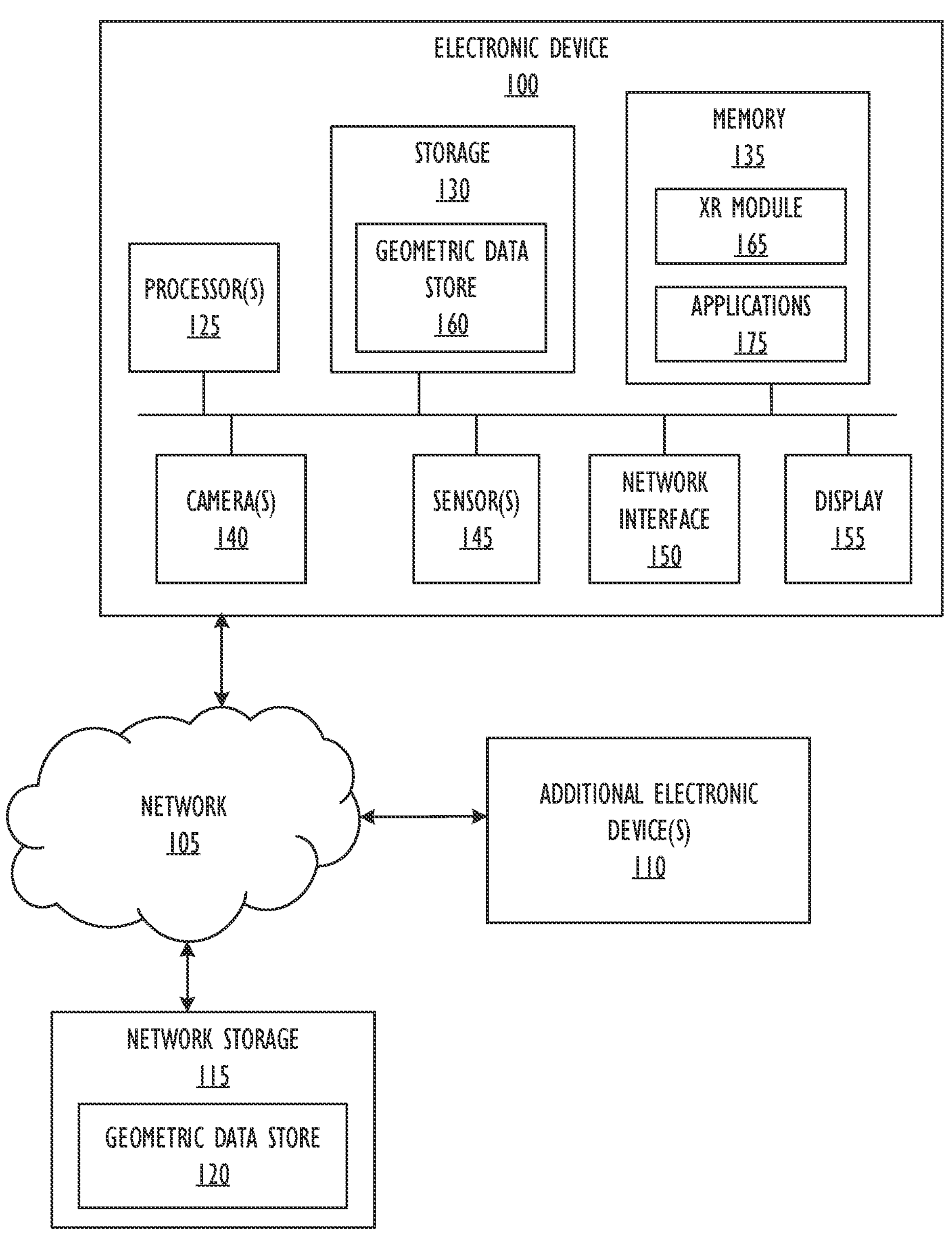
FIG. 1 shows, in block diagram form, exemplary systems for use in various extended reality technologies.

This disclosure pertains to systems, methods, and computer readable media to provide a multi-user communication session and duplicates of shared virtual objects in the multi-user communication session. In particular, a first environmental representation of a multi-user communication for a first device participating in the multi-user communication session may be presented. A second device may be participating in the multi-user communication session. The first environmental representation and a second environmental representation of the multi-user communication device for the second device include one or more shared virtual objects presented in a common spatial configuration. A particular shared virtual object located at an initial location in the common spatial configuration may be duplicated, and a modified location in the first environmental representation for the duplicated virtual object may be determined. Then, a modified first environmental representation may be presented, including the duplicated virtual object at the modified location.

According to some embodiments, a presentation setting such as the presentation size of the duplicated virtual object may be modified from a shared presentation setting for the particular shared virtual object in the common spatial configuration. An indicator of the particular shared virtual object may be presented in the modified first environmental representation at the initial location in the common spatial configuration. The particular shared virtual object may be duplicated in accordance with a user input.

In some embodiments, the first device is in a first physical environmental with a first spatial configuration, and the particular shared virtual object may be duplicated in accordance with a determination that the first spatial configuration and the common spatial configuration do not satisfy a similarity criterion. As an example, the common spatial configuration for the multi-user communication session is a conference room configuration with a rectangular table. The first device is in a conference room with a circular table, rather than a rectangular table. Because the first spatial configuration with the circular table and the common spatial configuration with the rectangular table do not satisfy a similarity criterion, the particular shared virtual object may be duplicated.

In some embodiments, the duplicated virtual object may be consolidated with the particular shared virtual object at the initial location in the common spatial configuration in accordance with a determination that the first spatial configuration and the common spatial configuration satisfy the similarity criterion. For example, the first device may be moved to a room with a rectangular table, such that the spatial configuration of the room with the rectangular table and the common spatial configuration satisfy the similarity criterion. The first environmental representation may then be presented based on the common spatial configuration with the particular shared virtual object at the initial location rather than the duplicated shared virtual object at the modified location.

In some examples, the second environmental representation of the multi-user communication session for the second device is modified from the common spatial configuration, and includes a second duplicated virtual object at a second modified location. The first environmental representation or the modified first environmental representation may include an indicator of the second duplicated virtual object at a location in the first environmental representation corresponding to the second modified location. The indicator of the second duplicated virtual object may be presented in the first environmental representation or the modified first environmental representation in accordance with a user input regarding the second environmental representation or the second user avatar.

In some examples, the second user may make a modification to the second duplicated virtual object in the second environmental representation, for example writing on a duplicated whiteboard virtual object. The first device may obtain an indication of the modification to the second duplicated virtual object, and a corresponding modification to the duplicated virtual object in the modified first environmental representation. That is, the duplicated whiteboard virtual object in the modified first environmental representation may be updated to include the second user's writing on the duplicated whiteboard virtual object in the second environmental representation. In some examples, the first user may modify the duplicated virtual object in the modified first environmental representation, and a modification alert may be presented with the particular shared virtual object at the initial location in the common spatial configuration.

Various examples of electronic systems and techniques for using such systems in relation to various technologies are described.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

For purposes of this disclosure, a multi-user communication session can include an XR environment in which two or more devices are participating.

For purposes of this disclosure, a local multi-user communication device refers to a current device being described, or being controlled by a user being described, in a multi-user communication session.

For purposes of this disclosure, collocated multi-user communication devices refer to two devices that share a physical environment and an XR environment, such that the users of the collocated devices may experience the same physical objects and XR objects.

For purposes of this disclosure, a remote multi-user communication device refers to a secondary device that is located in a separate physical environment from a current, local multi-user communication device. In one or more embodiments, the remote multi-user communication device may be a participant in the XR session.

For purposes of this disclosure, shared virtual objects refer to XR objects that are visible or otherwise able to be experienced by participants in a common XR session.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics modeling systems having the benefit of this disclosure.

Referring to FIG. 1, a simplified block diagram of an electronic device 100 is depicted, communicably connected to additional electronic devices 110 and a network storage 115 over a network 105, in accordance with one or more embodiments of the disclosure. Electronic device 100 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 100, additional electronic device 110, and/or network storage 115 may additionally, or alternatively, include one or more additional devices within which the various functionality may be contained, or across which the various functionality may be distributed, such as server devices, base stations, accessory devices, and the like. Illustrative networks, such as network 105 include, but are not limited to, a local network such as a universal serial bus (USB) network, an organization's local area network, and a wide area network such as the Internet. According to one or more embodiments, electronic device 100 is utilized to participate in an XR multi-user session. It should be understood that the various components and functionality within electronic device 100, additional electronic device 110 and network storage 115 may be differently distributed across the devices, or may be distributed across additional devices.

Electronic Device 100 may include one or more processors 125, such as a central processing unit (CPU). Processor(s) 125 may include a system-on-chip such as those found in mobile devices and include one or more dedicated graphics processing units (GPUs). Further, processor(s) 125 may include multiple processors of the same or different type. Electronic device 100 may also include a memory 135. Memory 135 may include one or more different types of memory, which may be used for performing device functions in conjunction with processor(s) 125. For example, memory 135 may include cache, ROM, RAM, or any kind of transitory or non-transitory computer readable storage medium capable of storing computer readable code. Memory 135 may store various programming modules for execution by processor(s) 125, including XR module 165 and other various applications 175. Electronic device 100 may also include storage 130. Storage 130 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Storage 130 may be configured to store geometric data store 160, according to one or more embodiments.

Electronic device 100 may also include one or more cameras 140 or other sensors 145, such as depth sensor, from which depth of a scene may be determined. In one or more embodiments, each of the one or more cameras 140 may be a traditional RGB camera, or a depth camera. Further, cameras 140 may include a stereo- or other multi-camera system, a time-of-flight camera system, or the like. Electronic device 100 may also include a display 155. The display device 155 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Storage 130 may be utilized to store various data and structures which may be utilized for providing state information in order to track an application and system state. Storage 130 may include, for example, geometric information store 160. Geometric information store 160 may be utilized to store geometric information for a physical environment of electronic device 100 or a particular physical environment in which electronic device 100 is used for multi-user communication sessions. In one or more embodiments, geometric data may include a depth map, a blueprint layout, images, semantic information regarding horizontal and vertical surfaces, identified objects, and the like for a physical environment which may be utilized by XR module 165 to generate an environmental representation of a multi-user communication session. In one or more embodiments, geometric information may be stored occasionally, periodically, or in response to a trigger, such as initialization of a multi-user communication session or a request from another module or device. In one or more embodiments, the geometric information may be stored locally at each system, such as electronic device 100 and additional electronic devices 110, and/or the geometric information may be stored in global geometric information store 120 as part of network storage 115. In some embodiments, the global geometric information store 120 comprises centralized information regarding shared boundaries, orientation, and height of objects in the physical environments for multiple remote multi-user communication devices, rather than complete room scans for each physical environment in order to protect the privacy of the respective users of the remote multi-user communication devices.

According to one or more embodiments, memory 135 may include one or more modules that comprise computer readable code executable by the processor(s) 125 to perform functions. The memory may include, for example an appearance XR module 165 which may be used to provide a multi-user communication session in an XR environment. The multi-user communication session XR environment may be a computing environment which supports a shared experience by electronic device 100 as well as additional electronic devices 110 within a multi-user communication session. The memory may also include, for example other applications 175 which may be used to provide one or more shared virtual objects to participants in a multi-user communication session provided by XR module 165. For example, other applications 175 may include a presentation application that provides a presentation panel shared virtual object, a collaboration application that provides a collaboration space shared virtual object, and the like.

Although electronic device 100 is depicted as comprising the numerous components described above, in one or more embodiments, the various components may be distributed across multiple devices. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 2A:
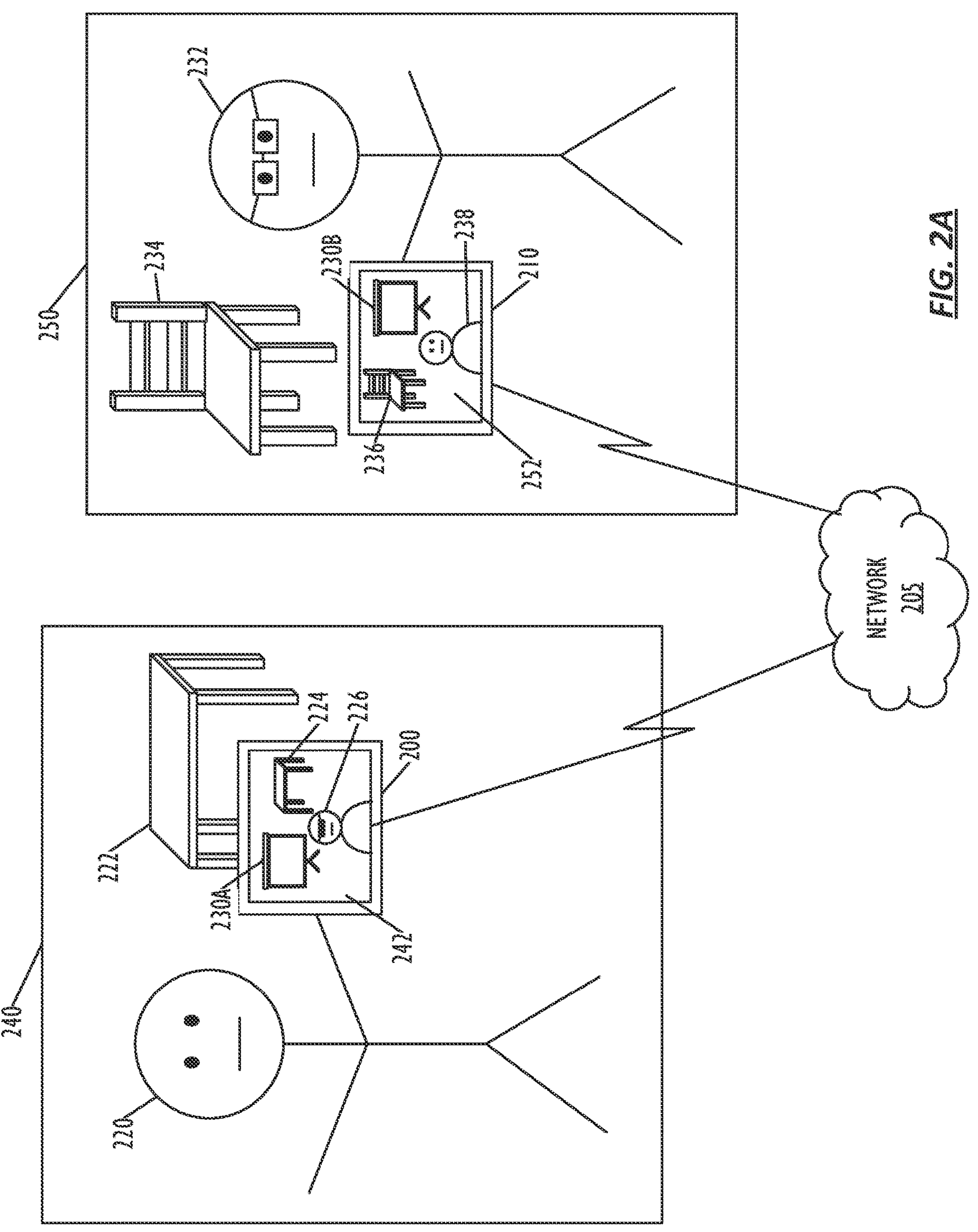
FIGS. 2A-B show diagrams of example operating environments, according to one or more embodiments.
Figure 2B:
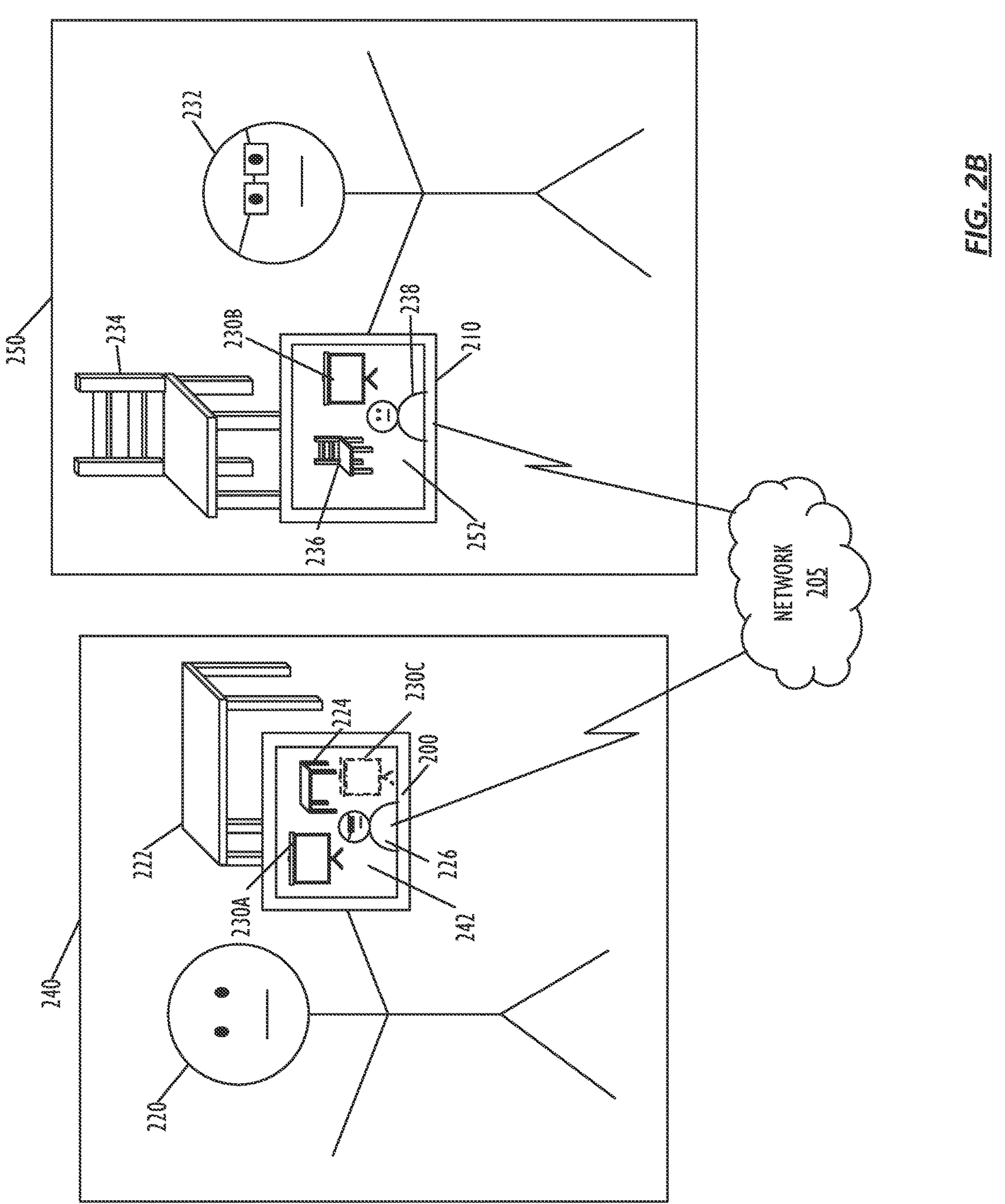

FIGS. 2A-B show diagrams of example operating environments, according to one or more embodiments. While pertinent features are shown, those of ordinary skill in the art will appreciate from the present disclosure that various other features have not been illustrated for the sake of brevity and so as not to obscure more pertinent aspects of the example among implementations disclosed herein. To that end, as a nonlimiting example, the operating environment 240 includes a first physical environment, whereas operating environment 250 includes a second physical environment.

As shown in FIG. 2A, the first environment 240 includes a first user 220 that is utilizing a first electronic device 200, and the second environment 250 includes a second user 232 that is utilizing a second electronic device 210. In one or more embodiments, the first electronic device 200 and the second electronic device 210 include mobile devices, such as handheld devices, wearable devices, and the like.

In one or more embodiments the first electronic device 200 and the second electronic device 210 communicate with each other via a network 205. Examples of network 205 may include, for example, the Internet, a wide area network (WAN), a local area network (LAN), etc. In one or more embodiments, the first electronic device 200 and the second electronic device 210 may be participating in a common multi-user ER environment.

Although electronic device 200 and electronic device 210 may be participating in a common multi-user communication session environment, the virtual environment may be rendered differently on each device. As shown, the electronic device 200 may depict physical objects of the environment 240. As shown, physical table 222 may be depicted on the display 242 as a virtual table 224. In one or more embodiments, the display 242 may be a pass-through display, and virtual table 224 may simply be a view of physical table 222 through display 242.

Display 242 of electronic device 200 may also include an avatar 226 corresponding to user 232 in physical environment 250. For purposes of this disclosure, and avatar may include a virtual representation of a user. The avatar may depict real-time actions of the corresponding user 232, including movement, updated location, and/or interactions with various physical components and/or virtual components within the co-presence XR environment. An avatar may or may not mimic physical characteristics of the user, and may or may not mimic facial expressions of the user.

According to one or more embodiments, a multi-user XR environment may support one or more multi-user applications or other modules which allow for depictions of virtual objects across all participating devices, such as electronic device 200 and electronic device 210. As shown in display 242, presentation panel 230A is an example of a virtual object which may be visible to all participating devices.

As an example, returning to environment 250, electronic device 210 includes a display 252, on which the presentation panel virtual object 230B is depicted. It should be understood that in one or more embodiments, although the same virtual object may be visible across all participating devices, the virtual object may be rendered differently according to the location of the electronic device, the orientation of the electronic device, or other physical or virtual characteristics associated with electronic devices 200 and 210 and/or the multi-user XR environment depicted within displays 242 and 252. For example, the presentation panel virtual object 230B may be a duplicate of the shared presentation panel virtual object that the second user 232 has moved from an initial location in a common spatial configuration of the multi-user communication session. In FIG. 2B, the multi-user XR environment depicted on display 242 includes an indicator 230C at a location of the duplicated presentation panel virtual object 230B. Indicator 230C may be depicted on display 242 to illustrate why the avatar 226 corresponding to user 232 in physical environment 250 is not looking in the direction of the shared presentation panel virtual object 230A at the initial location in the common spatial configuration of the multi-user communication session.

Returning to environment 250, another characteristic of multi-user XR environment is that while virtual objects may be shared across participating devices, physical worlds may appear different. As such, physical chair 234 is depicted as virtual chair 236. As described above, and one or more embodiments, display 252 may be a pass-through display, and virtual chair 236 may be a view of physical chair 234 through the pass-through display 252. In addition, electronic device 210 depicts an avatar 238 corresponding to user 220 within physical environment 240.

According to one or more embodiments, the virtual objects, such as presentation panel 230, may be rendered as part of an application. In one or more embodiments, multiple applications may be executed within the multi-user communication session XR environment depicted in 242 and 252.

FIG. 3 shows, in flow chart form, an example method 300 for improving duplication of shared virtual objects in an XR environment, according to one or more embodiments. For purposes of explanation, the following steps will be described in the context of FIGS. 1 and 2A-B. However, it should be understood that the various actions may be taken by alternate components. In addition, the various actions may be performed in a different order. Further, some actions may be performed simultaneously, and some may not be required, or others may be added, according to various embodiments. The various actions may be performed remotely by a server device, by a single electronic device, and/or distributed between multiple electronic devices.

The flow chart begins at 310, where XR module 165 presents an environmental representation of a multi-user communication session. The environmental representation may be presented for a first device participating in the multi-user communication session and associated with a first user, for example the environmental representation of the multi-user communication session presented on display 242 of first electronic device 200 associated with first user 220. Other devices may be participating in the multi-user communication session, such as the second electronic device 210 associated with the second user 232, and the other devices each have corresponding environmental representations of the multi-user communication session, such as the environmental representation presented on display 252 of electronic device 210. The environmental representations of the multi-user communication session include a shared virtual object displayed in a common spatial configuration across devices active within the multi-user communication session, such as the presentation panel virtual object 230A-B in the common spatial configuration shown in FIG. 2A. For example, the multi-user communication session is for a meeting with six participants in remote locations. In the common spatial configuration, the six user avatars are arranged around the sides and the head of a rectangular table, and a presentation panel shared virtual object is arranged at the foot of the rectangular table.

At 320, XR module 165 duplicates the shared virtual object. The shared virtual object may be at an initial location in the common spatial configuration for the multi-user communication session. At 330, XR module 165 may determine a modified location in the environmental representation for the duplicated virtual object. Returning to the example multi-user communication session for a meeting with six participants, XR module 165 may duplicate the presentation panel virtual object and determine a modified location for the duplicated presentation panel directly in front of the first user's avatar, rather than at the foot of the rectangular table in the common spatial configuration. At 340, XR module 165 may present a modified environmental representation including the duplicated virtual object at the modified location. In the example multi-user communication session for a meeting with six participants, XR module 165 presents a modified environmental representation for the first device with the duplicated presentation panel in front of the first user. Returning to the example shown in FIGS. 2A-B, the environmental representation shown in FIG. 2A on display 242 of device 200 includes the presentation panel virtual object 230A in the initial spatial configuration. After the presentation panel virtual object 230A is duplicated and moved to its modified location in steps 320 and 330, the environmental representation shown in FIG. 2B on display 242 of device 200 includes the duplicated presentation panel virtual object 230C at the modified location.

The environmental representation for the first device differs from the common spatial configuration, which is now shared by a subset of the electronic devices active in the multi-user communication session rather than all of the electronic devices. In some embodiments, the shared virtual object may cease to be presented in a common spatial configuration for the other active devices in response to the duplicated virtual object being presented at the modified location for one device. For example, the presentation panel virtual object may be moved from its initial location in the common spatial configuration to directly in front of each user of the respective devices. In some embodiments, the shared virtual object at the initial location in the common spatial configuration may be presented in the environmental representation for the first device in addition to the duplicated virtual object at the modified location, as shown in FIG. 2B on display 242 of device 200 with duplicated presentation panel virtual object 230C at the modified location and the presentation panel virtual object 230A at the initial location in the common spatial configuration. In other embodiments, the shared virtual object at the initial location is not presented. In some embodiments, the shared virtual object at the initial location is not presented, but an indicator is presented at the initial location in the common spatial configuration such that a user has context for why the other user avatars appear to be looking in a particular direction towards the initial location. In the example multi-user communication session for a meeting with six participants, XR module 165 may present an indicator at the foot of the rectangular table so the first user has context for why the other five user avatars appear to be looking towards the foot of the rectangular table, rather than directly in front of the first user towards the duplicated presentation panel virtual object.

Figure 4:
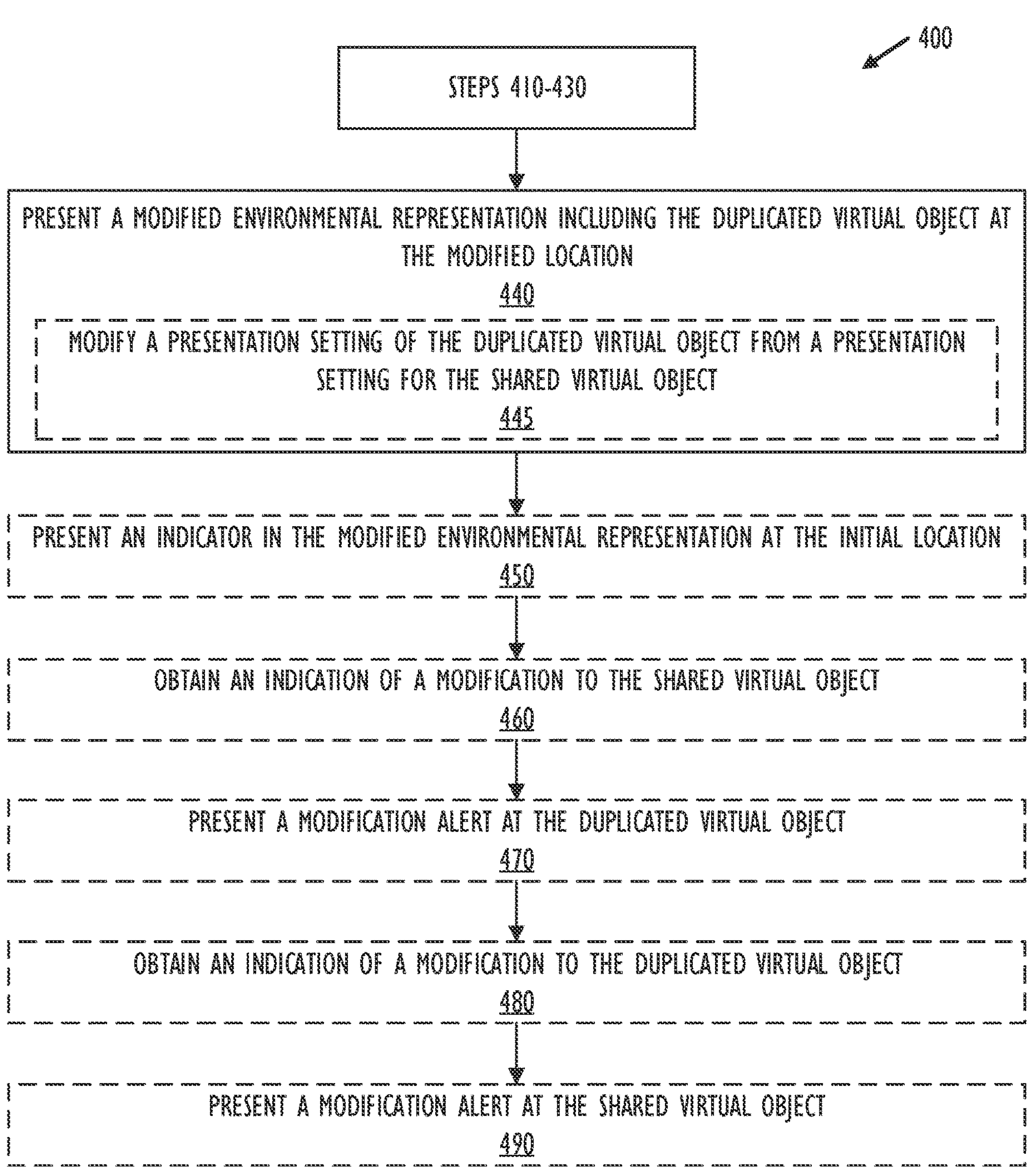
FIG. 4 shows, in flow chart form, a further example method for improving duplication of shared virtual objects in an XR environment, according to one or more embodiments.

FIG. 4 shows, in flow chart form, a further example method 400 for improving duplication of shared virtual objects in an XR environment including modifying a presentation setting of the duplicated virtual object, according to one or more embodiments. In one or more embodiments, certain actions take place as part of presenting a modified environmental representation. Still other actions comprise additional functionality. However, the various actions may take place in other locations within the flow chart of FIG. 4. For purposes of explanation, the following steps will be described in the context of FIGS. 1 and 2A-B. However, it should be understood that the various actions may be taken by alternate components. In addition, the various actions may be performed in a different order. Further, some actions may be performed simultaneously, and some may not be required, or others may be added. The various actions may be performed remotely by a server device, by a single electronic device, and/or distributed between multiple electronic devices.

Steps 410-440 are substantially the same as steps 310-340 described herein with reference to FIG. 3. Presenting the modified environmental representation at step 440 may optionally include step 445, at which XR module 165 modifies a presentation setting of the duplicated virtual object from a presentation setting for the shared virtual object in the common spatial configuration. Returning to the example multi-user communication session for a meeting with six participants, XR module 165 may adjust a size setting for the duplicated presentation panel placed directly in front of the first user's avatar such that the duplicated presentation panel appears the size of a computer screen or tablet, rather than the larger, pull-down screen size of the presentation panel in the common spatial configuration at the foot of the rectangular table.

At 450, XR module 165 may optionally present an indicator in the modified environmental representation at the initial location. In an example multi-user communication session, two users in remote locations are collaborating on a whiteboard shared virtual object. XR module 165 duplicates the whiteboard shared virtual object and presents a modified environmental representation for the first user including the duplicated whiteboard virtual object at a modified location and an indicator at the initial location for the whiteboard shared virtual object in the common spatial configuration. At 460, XR module 165 may optionally obtain an indication of a modification to the shared virtual object and present a modification alert at the duplicated virtual object at step 470. Returning to the example multi-user communication session with the whiteboard shared virtual object, XR module 165 may obtain an indication of a modification to the whiteboard shared virtual object, such as additional writing on the whiteboard by the second user. XR module 165 then presents a modification alert at the duplicated whiteboard virtual object in the environmental representation for the first user. The modification alert may be an alert of additional writings on the whiteboard and/or may be indicative of the additional writing by the second user.

At 480, XR module 165 may optionally obtain an indication of a modification to the duplicated virtual object, and present a modification alert at the shared virtual object at step 490. In the multi-user communication session with the whiteboard virtual object, XR module 165 may obtain an indication of additional writing by the first user on the duplicated whiteboard virtual object. XR module 165 then presents a modification alert at the whiteboard shared virtual object, such that an environmental representation of the multi-user communication session for the second user that includes the whiteboard shared virtual object in the common spatial configuration also includes the modification alert. As discussed previously herein with reference to step 470, the modification alert may be an alert of additional writings on the whiteboard and/or may be indicative of the additional writings by the first user.

Figure 5:
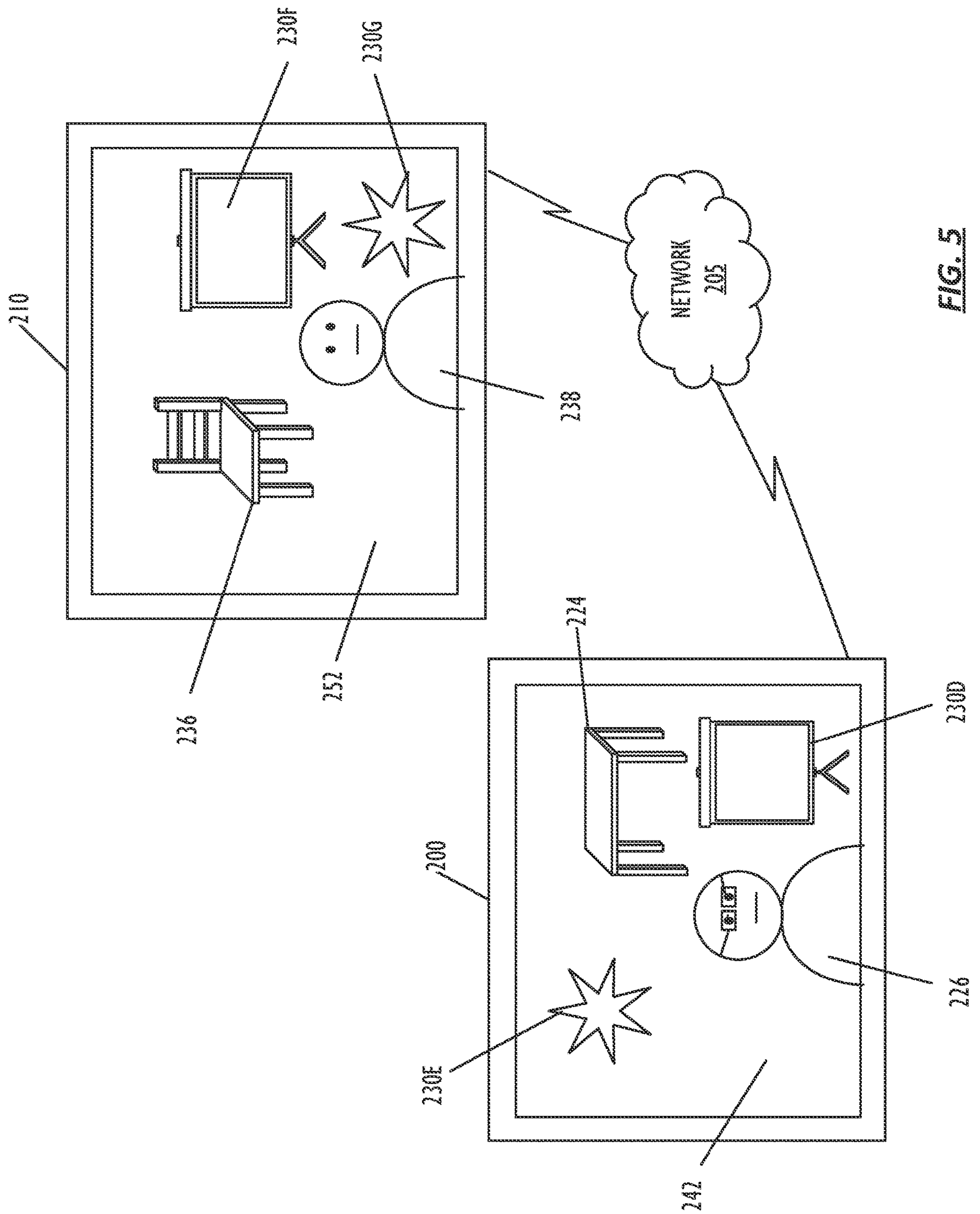
FIG. 5 shows a diagram of example environmental representations for a first and a second electronic device, according to one or more embodiments.

FIG. 5 shows a diagram of example environmental representations of a multi-user communication session for a first and a second electronic device active in the multi-user communication session, according to one or more embodiments. While pertinent features are shown, those of ordinary skill in the art will appreciate from the present disclosure that various other features have not been illustrated for the sake of brevity and so as not to obscure more pertinent aspects of the example among implementations disclosed herein. For ease of explanation, FIG. 5 is described with reference to FIGS. 2A-B.

The first environmental representation of the multi-user communication session shown on display 242 of device 200 may be different from the second environmental representation of the multi-user communication session shown on display 252 of device 210. The first environmental representation includes a virtual object 230D at a first location and an indicator 230E at a second location. The second environmental representation includes a virtual object 230F at a third location and an indicator 230G at a fourth location.

In some embodiments, the virtual object 230D may be a duplicated virtual object from a shared virtual object and the first location in the first environmental representation may be a modified location from an initial location for the shared virtual object in the common spatial configuration. The indicator 230E may be an indicator of the shared virtual object and the second location in the first environmental representation may correspond to the initial location for the shared virtual object in the common spatial configuration. The virtual object 230F in the second environmental representation may be the shared virtual object and the third location in the second environmental representation may correspond to the initial location in the common spatial configuration. The indicator 230G may be an indicator of the duplicated virtual object 230D in the first environmental representation, and the fourth location in the second environmental representation may correspond to the first location in the first environmental representation for the duplicated virtual object 230D. The indicator 230G may offer context to a user of the second device regarding why the avatar 238 for a user of the first device is looking in a particular direction away from the shared virtual object in the common spatial configuration presented in the second environmental representation.

In some embodiments, duplicating the shared virtual object and presenting the duplicated virtual object at a modified location in a first environmental representation of the multi-user communication session may cause the shared virtual object to cease to be presented in the common spatial configuration in the second environmental representation of the multi-user communication session. In those embodiments, the third location of the virtual object 230F may correspond to a modified location for the shared virtual object in the second environmental representation in response to the common spatial configuration being broken. The indicator 230E may be an indicator of the shared virtual object 230F at the third location in the second environmental representation, and the second location in the first environmental representation may correspond to the third location of the shared virtual object in the second environmental representation.

Figure 6:
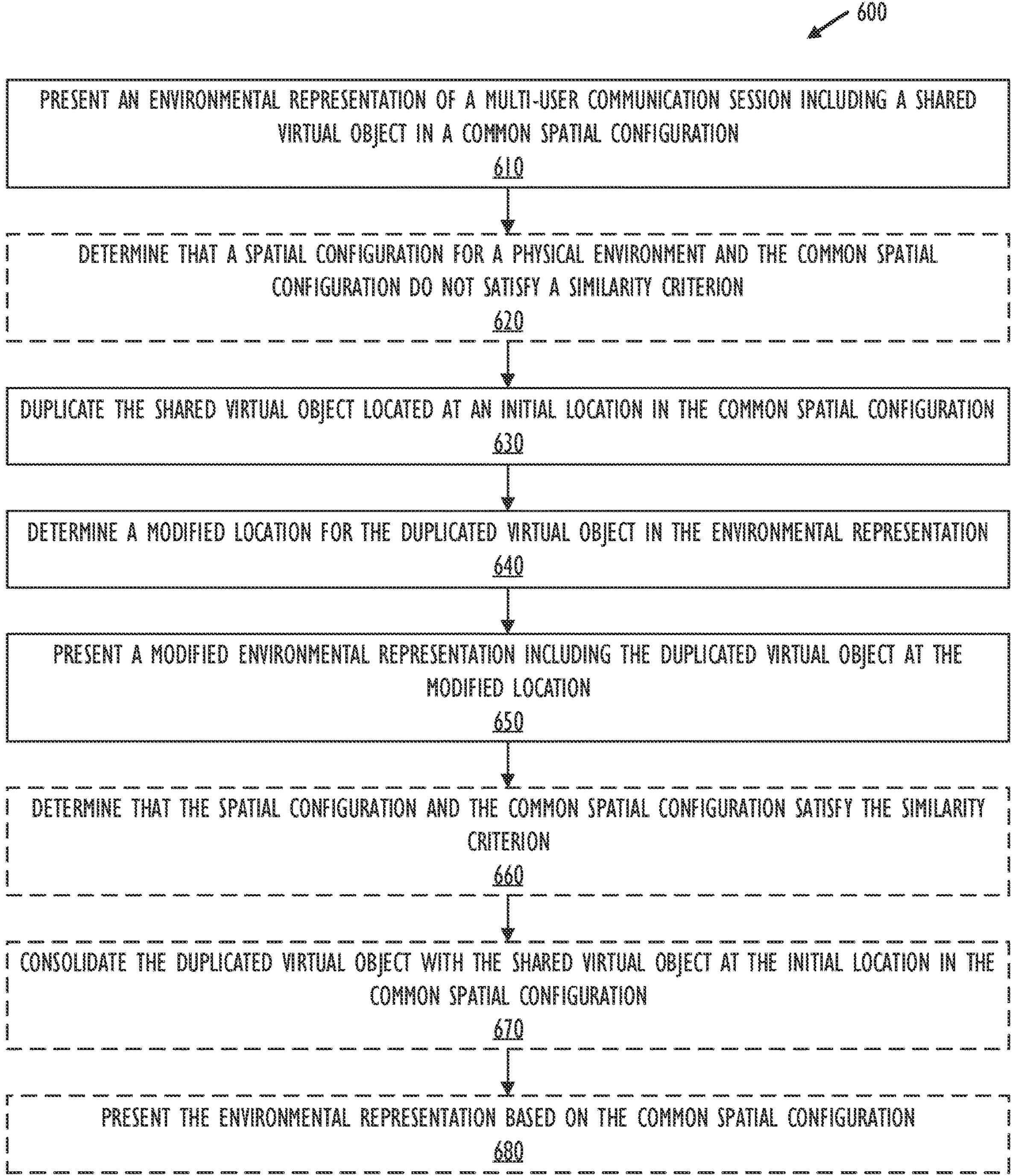
FIG. 6 shows, in flow chart form, a further example method for improving duplication of shared virtual objects in an XR environment, according to one or more embodiments.

FIG. 6 shows, in flow chart form, a further example method for improving duplication of shared virtual objects in an XR environment including consolidating the duplicated virtual object with the shared virtual object when the spatial configuration for the first physical environment and the common spatial configuration satisfy the criterion, according to one or more embodiments. In one or more embodiments, certain actions comprise additional functionality. However, the various actions may take place in other locations within the flow chart of FIG. 6. For purposes of explanation, the following steps will be described in the context of FIGS. 1 and 2A-B. However, it should be understood that the various actions may be taken by alternate components. In addition, the various actions may be performed in a different order. Further, some actions may be performed simultaneously, and some may not be required, or other may be added. The various actions may be performed remotely by a server device, by a single electronic device, and/or distributed between multiple electronic devices.

The flow chart begins at 610, where XR module 165 presents an environmental representation of a multi-user communication session (e.g., in a manner similar or identical to step 310 described above). At step 620, XR module 165 may optionally determine that a spatial configuration for the physical environment of the first device participating in the multi-user communication session and the common spatial configuration do not satisfy a similarity criterion. Returning to the example multi-user communication session for a meeting with six participants, the first user and the first device may be in a remote conference room which makes it relatively easy to conform the environmental representation of the multi-user communication session with the common spatial configuration. However, the first user and the first device may move from the remote conference room to a smaller office with a desk instead of a rectangular table, which has a spatial configuration that diverges from the common spatial configuration. The similarity criterion may represent a threshold spatial similarity or another appropriate measure of similarity between the spatial configuration of the first user's physical environment and the common spatial configuration for the multi-user communication session.

At 630, XR module 165 duplicates the shared virtual object located at the initial location in the common spatial configuration (e.g., in a manner similar or identical to step 320 described above). At 640, XR module 165 determines a modified location for the duplicated virtual object in the environmental representation and presents a modified environmental representation including the duplicated virtual object at the modified location at step 650 (e.g., in a manner similar or identical to steps 330 and 340 described above). In the example multi-user communication session for a meeting with six participants, XR module 165 may duplicate the presentation panel virtual object and determine a modified location on the desk in the smaller office for the duplicated presentation panel. XR module 165 then presents the modified environmental representation of the multi-user communication session with the duplicated presentation panel on the desk.

At 660, XR module 165 may optionally determine that the spatial configuration for the physical environment and the common spatial configuration satisfy the similarity criterion. Returning to the example multi-user communication session for a meeting with six participants, the first user and the first device may return to the remote conference room that conforms with the common spatial configuration from the smaller office with the desk instead of a rectangular table and a spatial configuration that diverges from common spatial configuration. At 670, XR module 165 may optionally consolidate the duplicated virtual object with the shared virtual object at the initial location in the common spatial configuration. In the example multi-user communication session for a meeting with six participants, XR module 165 may move the duplicated presentation panel from the modified location to the initial location in the common spatial configuration and consolidate the duplicate with the shared presentation panel virtual object. At 680, XR module 165 may optionally present the environmental representation based on the common spatial configuration, rather than presenting the modified environmental representation with the duplicated virtual object at the modified location.

FIG. 7 shows, in flow chart form, a further example method for improving duplication of shared virtual objects in an XR environment including displaying an indication of a duplicated virtual object in other environmental representations of the multi-user communication session, according to one or more embodiments. In one or more embodiments, certain actions comprise additional functionality. The various actions may take place in other locations within the flow chart of FIG. 7. For purposes of explanation, the following steps will be described in the context of FIGS. 1 and 2A-B. However, it should be understood that the various actions may be taken by alternate components. In addition, the various actions may be performed in a different order. Further, some actions may be performed simultaneously, and some may not be required, or other may be added. The various actions may be performed remotely by a server device, by a single electronic device, and/or distributed between multiple electronic devices.

The flow chart begins at step 710 where XR module 165 presents a first environmental representation of a multi-user communication session including a shared virtual object in a common spatial configuration (e.g., in a manner similar or identical to step 310 described above). The first environmental representation and XR module 165 may be associated with a first device used by a first user in a first physical environment. At step 720, XR module 165 obtains an indication that a second environmental representation of the multi-user communication session for a second device associated with a second user in a second physical environment is modified from the common spatial configuration. In some embodiments, XR module 165 may receive the indication that the second environmental representation is modified from the second device. In some embodiments, the second device provides the indication to the global geometric data store 120 in network storage 115. XR module 165 may receive or obtain the indication from the global geometric data store 120. In other embodiments, XR module 165 may obtain data regarding the second environmental representation from the second device or from the global geometric data store 120 and compare the second environmental representation to the common spatial configuration to obtain the indication that the second environmental representation is modified.

At 730, XR module 165 identifies a modified location of a duplicated virtual object in the second environmental representation. In the example of a multi-user communication session for a meeting with six participants, XR module 165 determines a second environmental representation of the meeting for a second user is modified from the common spatial configuration at step 720, and identifies the modified location of the presentation panel shared virtual object in the second environmental representation at step 730. For example, the second user has manipulated the presentation panel shared virtual object to make a duplicate presentation panel virtual object that is positioned directly in front of the second user's avatar, rather than at the foot of the rectangular table. XR module 165 identifies the modified location of the duplicate presentation panel virtual object in front of the second user's avatar. In some embodiments, XR module 165 identifies the modified location of the duplicated virtual object by comparing the second environmental representation to the common spatial configuration of the multi-user communication session. In some embodiments, XR module 165 identifies the modified location in the second environmental representation by receiving or obtaining an indication of the modified location from the second device. In other embodiments, the second device provides an indication of the modified location to the global geometric data store 120 in network storage 115, and XR module 165 identifies the modified location in the second environmental representation by receiving or obtaining the indication from the global geometric data store 120.

At 740, XR module 165 may present an indicator in the first environmental representation of the duplicated virtual object in the second environmental representation at the modified location. In some embodiments, the indicator of the duplicated virtual object in the second environmental representation may be presented in accordance with user input regarding the second environmental representation, such as input from the first user attempting to interact with the second user avatar or the like. For example in the multi-user communication session for a meeting with six participants, the XR module 165 displays an indicator in front of the second user's avatar in the environmental representation for the first user to give context for why the second user's avatar is not looking towards the presentation panel shared virtual object at the foot of the rectangular table in the common spatial configuration.

In the examples shown in FIGS. 2A-B, the presentation panel virtual object 230B may be a duplicate of a presentation panel shared virtual object and positioned at a modified location in the second environmental representation presented on display 252. In the first environmental representation presented on display 242, the presentation panel virtual object 230A may be the presentation panel shared virtual object at the initial location in the common spatial configuration, and the dashed line presentation panel 230C may be the indicator in the first environmental representation of the duplicated presentation panel 230B at the modified location in the second environmental representation.

Although the first environmental representation of the multi-user communication session does not itself include a duplicated virtual object at a modified location and is instead presented to the first user based on the common spatial configuration in the example process 700, no substantial changes are needed to perform process 700 with the modified environmental representation including the duplicated virtual object at the modified location described in step 340 above. That is, the first environmental representation will include a duplicated virtual object at a modified location and an indicator of the second duplicated virtual object at the second modified location in the second environmental representation.

Figure 8:
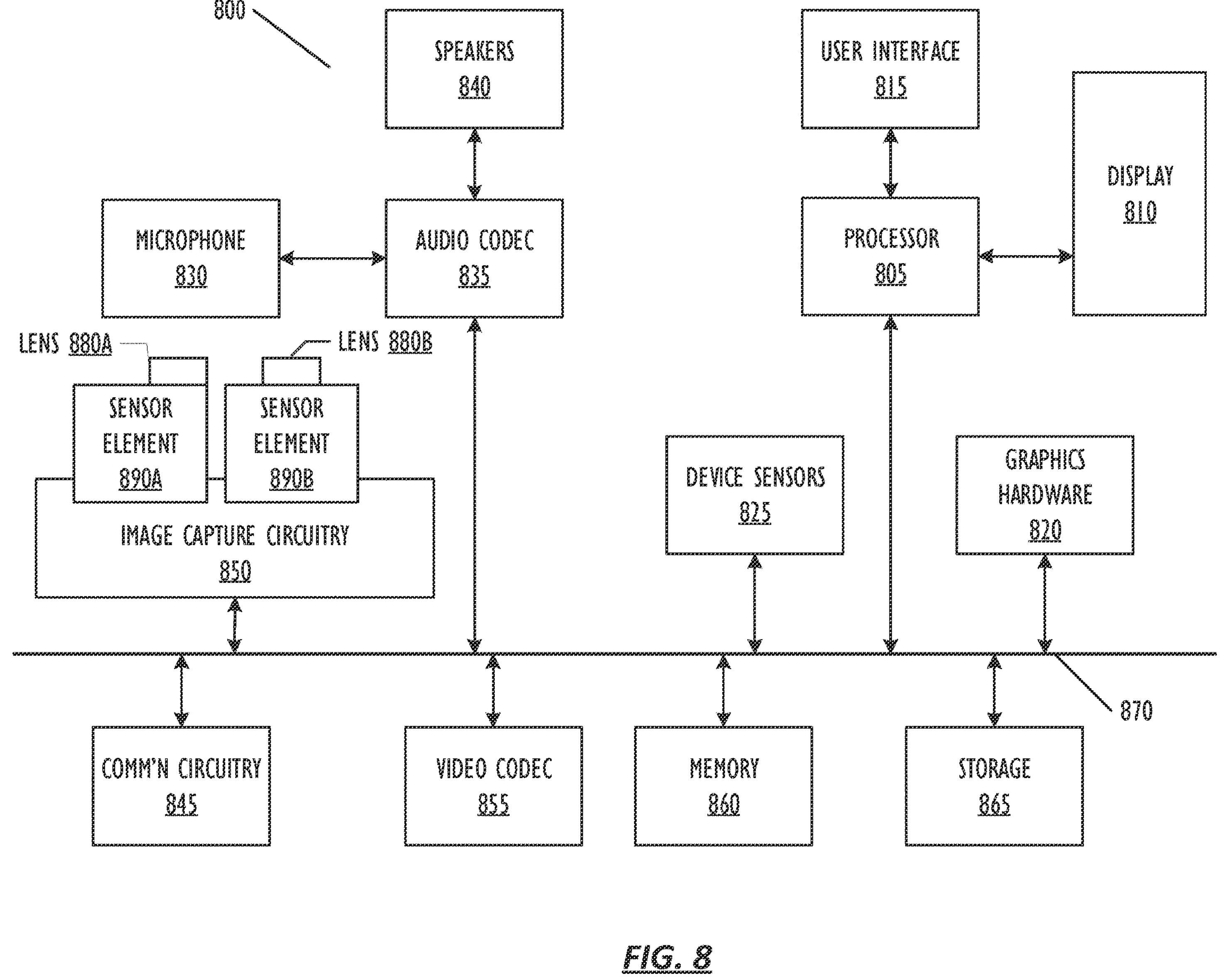
FIG. 8 shows, in block diagram form, a computer system in accordance with one or more embodiments.

Referring now to FIG. 8, a simplified functional block diagram of illustrative multifunction electronic device 800 is shown according to one embodiment. Each of electronic devices may be a multifunctional electronic device, or may have some or all of the described components of a multifunctional electronic device described herein. Multifunction electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, digital image capture circuitry 850 (e.g., including camera system) video codec(s) 855 (e.g., in support of digital image capture unit), memory 860, storage device 865, and communications bus 870. Multifunction electronic device 800 may be, for example, a digital camera or a personal electronic device such as a personal digital assistant (PDA), personal music player, mobile telephone, or a tablet computer.

Processor 805 may execute instructions necessary to carry out or control the operation of many functions performed by device 800 (e.g., such as the generation and/or processing of images as disclosed herein). Processor 805 may, for instance, drive display 810 and receive user input from user interface 815. User interface 815 may allow a user to interact with device 800. For example, user interface 815 can take a variety of forms, such as a button, keypad, dial, a click wheel, keyboard, display screen and/or a touch screen. Processor 805 may also, for example, be a system-on-chip such as those found in mobile devices and include a dedicated graphics processing unit (GPU). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 to process graphics information. In one embodiment, graphics hardware 820 may include a programmable GPU.

Image capture circuitry 850 may include two (or more) lens assemblies 880A and 880B, where each lens assembly may have a separate focal length. For example, lens assembly 880A may have a short focal length relative to the focal length of lens assembly 880B. Each lens assembly may have a separate associated sensor element 890. Alternatively, two or more lens assemblies may share a common sensor element. Image capture circuitry 850 may capture still and/or video images. Output from image capture circuitry 850 may be processed, at least in part, by video codec(s) 855 and/or processor 805 and/or graphics hardware 820, and/or a dedicated image processing unit or pipeline incorporated within circuitry 865. Images so captured may be stored in memory 860 and/or storage 865.

Sensor and camera circuitry 850 may capture still and video images that may be processed in accordance with this disclosure, at least in part, by video codec(s) 855 and/or processor 805 and/or graphics hardware 820, and/or a dedicated image processing unit incorporated within circuitry 850. Images so captured may be stored in memory 860 and/or storage 865. Memory 860 may include one or more different types of media used by processor 805 and graphics hardware 820 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to tangibly retain computer program instructions or code organized into one or more modules and written in any desired computer programming language. When executed by, for example, processor 805 such computer program code may implement one or more of the methods described herein.

As described above, one aspect of the present technology is the gathering and use of data available from various sources to improve the presentation of shared virtual objects in a multi-user communication session. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve the presentation of shared virtual objects in a multi-user communication session. Accordingly, use of such personal information data enables users to duplicate and modify presentation of shared virtual objects in a multi-user communication session. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 3-7 or the arrangement of elements shown in FIGS. 1, 2A-B, and 8 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method, comprising:

presenting, for a first device, a first environmental representation of a multi-user communication session, wherein the first device and a second device are active in the multi-user communication session, and wherein the first environmental representation and a second environmental representation of the multi-user communication session for the second device comprise a shared virtual object presented in a common spatial configuration;

obtaining an indication that the second environmental representation of the multi-user communication session for the second device comprises a duplicate of the shared virtual object;

identifying a modified location in the first environmental representation that corresponds to a location of the duplicate of the shared virtual object in the second environmental representation; and presenting an indicator of the duplicate of the shared virtual object at the modified location in the first environmental representation, wherein the shared virtual object ceases to be presented in the common spatial configuration in response to the indication that the second environmental representation of the multi-user communication session for the second device comprises the duplicate of the shared virtual object.

2. The method of claim 1, wherein the shared virtual object is duplicated in accordance with the second environmental representation of the multi-user communication session being modified from the common spatial configuration.

3. The method of claim 1, wherein the indicator is presented in accordance with a user input regarding the second environmental representation.

4. The method of claim 1, further comprising:

obtaining an indication of a modification to the duplicate of the shared virtual object in the second environmental representation; and implementing a corresponding modification to the indicator of the duplicate of the shared virtual object in the first environmental representation.

5. The method of claim 1, further comprising:

obtaining an indication of a modification to the duplicate of the shared virtual object; and presenting a modification alert with the shared virtual object at an initial location in the first environmental representation.

6. The method of claim 1, wherein presenting the indicator of the duplicate of the shared virtual object comprises modifying a presentation setting of the indicator of the duplicate of the shared virtual object from a presentation setting for the shared virtual object in the first environmental representation.

7. The method of claim 6, wherein the presentation setting comprises a presentation size, and wherein a presentation size of the indicator of the duplicate of the shared virtual object is smaller than a presentation size for the shared virtual object in the first environmental representation.

8. A non-transitory computer readable medium comprising computer readable code executable by one or more processors to:

present, for a first device, a first environmental representation of a multi-user communication session, wherein the first device and a second device are active in the multi-user communication session, and wherein the first environmental representation and a second environmental representation of the multi-user communication session for the second device comprise a shared virtual object presented in a common spatial configuration;

obtain an indication that the second environmental representation of the multi-user communication session for the second device comprises a duplicate of the shared virtual object;

identify a modified location in the first environmental representation that corresponds to a location of the duplicate of the shared virtual object in the second environmental representation; and present an indicator of the duplicate of the shared virtual object at the modified location in the first environmental representation, wherein the shared virtual object ceases to be presented in the common spatial configuration in response to the indication that the second environmental representation of the multi-user communication session for the second device comprises the duplicate of the shared virtual object.

9. The non-transitory computer readable medium of claim 8, wherein the shared virtual object is duplicated in accordance with the second environmental representation of the multi-user communication session being modified from the common spatial configuration.

10. The non-transitory computer readable medium of claim 8, wherein the indicator is presented is in accordance with a user input regarding the second environmental representation.

11. The non-transitory computer readable medium of claim 8, further comprising computer readable code to:

obtain an indication of a modification to the duplicate of the shared virtual object in the second environmental representation; and implement a corresponding modification to the indicator of the duplicate of the shared virtual object in the first environmental representation.

12. The non-transitory computer readable medium of claim 8, further comprising computer readable code to:

obtain an indication of a modification to the duplicate of the shared virtual object; and present a modification alert with the shared virtual object at an initial location in the first environmental representation.

13. The non-transitory computer readable medium of claim 8, wherein the computer readable code to present the indicator of the duplicate of the shared virtual object comprises computer readable code to modify a presentation setting of the indicator of the duplicate of the shared virtual object from a presentation setting for the shared virtual object in the first environmental representation.

14. The non-transitory computer readable medium of claim 13, wherein the presentation setting comprises a presentation size, and wherein a presentation size of the indicator of the duplicate of the shared virtual object is smaller than a presentation size for the shared virtual object in the first environmental representation.

15. A system comprising:

one or more processors; and one or more computer readable media comprising computer readable code executable by the one or more processors to:

present, for a first device, a first environmental representation of a multi-user communication session, wherein the first device and a second device are active in the multi-user communication session, and wherein the first environmental representation and a second environmental representation of the multi-user communication session for the second device comprise a shared virtual object presented in a common spatial configuration;

obtain an indication that the second environmental representation of the multi-user communication session for the second device comprises a duplicate of the shared virtual object;

identify a modified location in the first environmental representation that corresponds to a location of the duplicate of the shared virtual object in the second environmental representation; and present an indicator of the duplicate of the shared virtual object at the modified location in the first environmental representation, wherein the shared virtual object ceases to be presented in the common spatial configuration in response to the indication that the second environmental representation of the multi-user communication session for the second device comprises the duplicate of the shared virtual object.

16. The system of claim 15, wherein the shared virtual object is duplicated in accordance with the second environmental representation of the multi-user communication session being modified from the common spatial configuration.

17. The system of claim 15, wherein the indicator is presented is in accordance with a user input regarding the second environmental representation.

18. The system of claim 15, further comprising computer readable code to:

obtain an indication of a modification to the duplicate of the shared virtual object in the second environmental representation; and implement a corresponding modification to the indicator of the duplicate of the shared virtual object in the first environmental representation.

19. The system of claim 15, further comprising computer readable code to:

obtain an indication of a modification to the duplicate of the shared virtual object; and present a modification alert with the shared virtual object at an initial location in the first environmental representation.

20. The system of claim 15, wherein the computer readable code to present the indicator of the duplicate of the shared virtual object comprises computer readable code to modify a presentation setting of the indicator of the duplicate of the shared virtual object from a presentation setting for the shared virtual object in the first environmental representation.

* * * * *